Feb. 4, 1941.                W. L. SCHULZE                2,230,699
                            BUDGET GAME BOARD
                            Filed Sept. 3, 1938
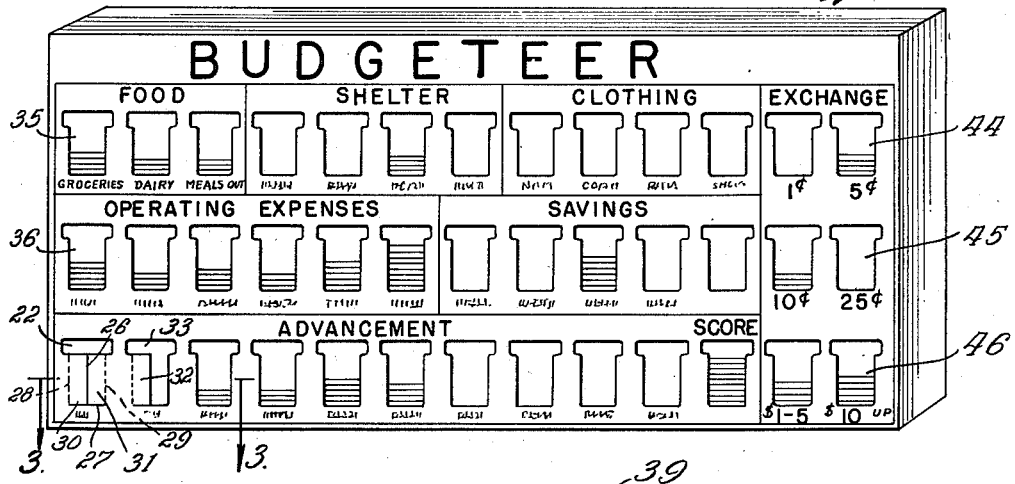
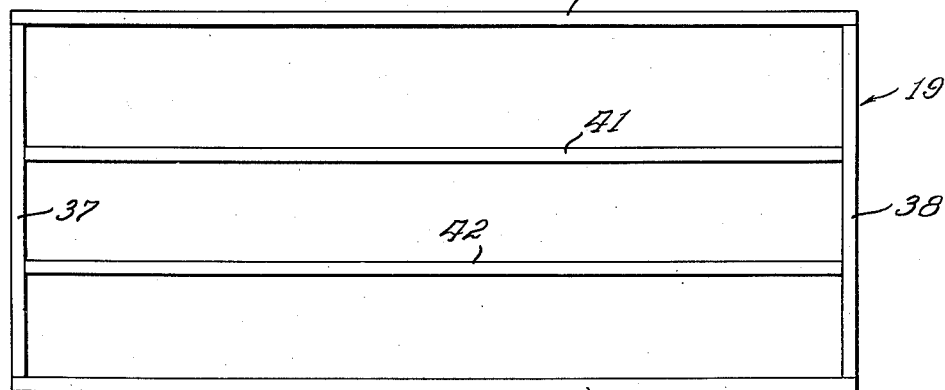
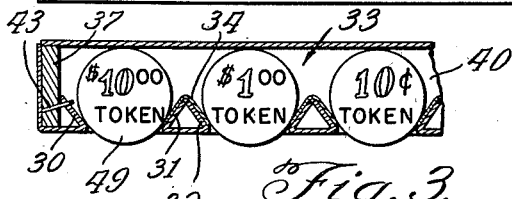
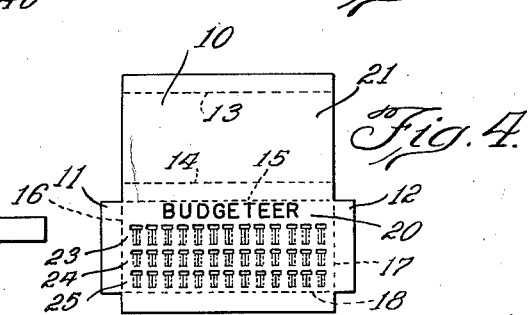
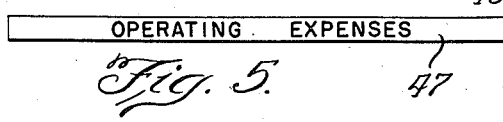
Inventor:
William L. Schulze
By: Wagner J. Stone
Att'y.

Patented Feb. 4, 1941

2,230,699

UNITED STATES PATENT OFFICE 2,230,699

BUDGET GAME BOARD

William L. Schulze, Chicago, Ill.

Application September 3, 1938, Serial No. 228,298

9 Claims. (Cl. 273—148)

This invention relates to a means for budgeting an income and more particularly to a game board for stimulating and retaining interest in the budgeting of an income.

The benefits to be gained by budgeting a family income are recognized by a large number of the American people, and yet only a few of this group actually budget their income. This failure to practice budgeting is due primarily to the difficulty of keeping a record of expenditures. Fundamentally, budgeting is the apportionment in advance of one's income to various needs and desires and thereafter the spending of one's income in accordance with the plan. In short, there must be a plan and a living up to the plan. In order to make a good plan, one must study one's expenditures, which requires a record of previous expenditures. The difficulty of keeping the record will depend upon the multiplicity of expense items. Thus, most budgets are kept in the head. A man who starts out Monday morning with six dollars for the week, knows that twenty cents for carfare and fifty cents for lunch will leave him thirty cents for newspaper, tobacco, and the like. But where a family is paying on a mortgage in semi-annual installments, on insurance every three months, and on an automobile each month, a mental record of expenditures is insufficient. A tangible record kept day by day is necessary.

The best tangible record is the book record,—bookkeeping,—which is used by all business concerns. But bookkeeping at home is rarely practicable. The woman of the household, who usually spends most of the money not allotted to fixed items of expense, does not have the time or the inclination, particularly where there are children, to sit down at a desk and keep books. Desk, ink and the rest are usually in living rooms and not in kitchens, which is the base of operations of most homes. All married men know that the uninterrupted duties of operating a household from morning till night militate against any woman's keeping any accurate record of expenditures. The fact of the matter is that the meat bill one week is twice that of the preceding week because of guests; that money spent on the children is wholly unknown; that the wife spends money for a dozen different classes of items during the course of a single day; that practically it is impossible to record how one spends one's money at the time of spending; and that the only means of knowing where the money goes is to make a record at home as soon as possible. And few will sit down to books after a shopping trip.

The first and principal object of this invention is to substitute for bookkeeping in budgeting a board with symbols or tokens for money. My purpose is to take advantage of the skill possessed by most of mankind in using flat disks for money transactions. I am acquainted with budget boxes in which the actual money is apportioned at the beginning of an income period into compartments and then removed. Such systems are wholly inadequate because in order to use them, a housewife must either carry them about with her or must draw off in advance what she is going to spend. This budgeting device is for people who keep their money in their pocketbooks or banks. The crux and success of my budgeting board lies in the fact that it places the minimum requirement upon the Budgeteer,—namely, when she or he arrives home, all he need to do is to repeat with the tokens as well as he can remember the actual transactions which he made previously in the day. This budget board provides a minimum excuse to the Budgeteer not to exercise his memory.

The second object of this invention is to provide a rack containing slots for the reception of the money symbols or tokens, adapted to be hung on the wall, readily available, and capable of rapid manipulation. A woman returning from shopping will not go to a writing desk and get out a budget book and make entries. She would spend a moment or two at a device hanging on the kitchen wall.

The third object of this invention is to provide a visual means of determining the status of an account at any point during the income period. Existing budget devices provide compartments for money. In a game where the major inducement to using the game is ease of operation, time spent counting money to determine balances is a total loss,—it is one of the elements which discourages budgeting. In my invention, the balance in an account is almost instantly apparent.

The fourth object of this invention is to introduce into budgeting elements, such as game competitiveness, which maintain interest in keeping the budget. In existing budget systems, the original enthusiasm is apt to wane before budgeting has become a habit. Most people who start a budget reach the place where they let the budget slide for two or three days and when they come to make it up, they cannot remember the entries, with the result that at the end of the budget period, they know the record is not exactly right, they have a trivial falling out, and quit. In addition to providing a very simple means for keeping the record of expenditures, I provide a way to give bonuses and penalties for (1) failing to keep the budget, (2) exceeding the budget estimates and (3) staying within the budget estimate. By providing monetary penalties for failing to stay within the budget and for failure to keep the budget, the parties will check each other carefully, which will go a long way toward obtaining accurate keeping of the budget during the critical first two or three months of use. The use of bonuses for (1) best budget estimates, (2) most budgets within estimates and (3) keeping budgets within estimates without criticism from other players will further maintain interest. One need not dwell on the importance of money as a factor in maintaining interest in anything.

The fifth object of this invention is the adaptation of my invention to other uses, notably sales contests and the like.

The above and other desirable objects of the present invention will become apparent upon reading the following description in conjunction with the accompanying sheet of drawings hereby made a part of this specification, and wherein:

Fig. 1 is a perspective view of the face of the budget board;

Fig. 2 is a front view of the wood frame;

Fig. 3 is a fragmentary cross sectional view taken on the line 3—3 of Fig. 1;

Fig. 4 is a face view of the cardboard blank from which the budget board is made;

Fig. 5 is a face view of an adhesive strip of paper bearing a major caption; and Fig. 6 is a face view of an adhesive strip of paper bearing a minor caption.

Like parts where shown and designated in the several views of the drawing and where referred to hereinafter will be indicated by the same reference character.

The disclosure of my invention may be divided into four parts: the board itself; use of the board for keeping a budget; use of the board for playing a budget game; and adaptation of the board to other uses.

Looking at Fig. 4, 10 is a sheet of heavy cardboard having wings 11 and 12, and scorings 13, 14, 15, 16, 17 and 18, for folding over a wooden frame, generally indicated as 19,—see Fig. 2. The digit 20 identifies the face of the board and 21 identifies the back. While sheet 10 is still in the flat form, its face is printed within decorative material, such as the name Budgeteer, but the headings such as Food, etc., are stickers applied by the players, as described below. The face 20 is punched with a series of rectangular slots, such as 22, arranged in banks 23, 24 and 25. Centrally of each slot 22 and at right angles thereto is slit 26, and at the base of slit 26 and at right angles thereto is slit 27. Parallel to slit 26 and at opposite sides thereto are scorings 28 and 29, which form wings 30 and 31,—see the lower bank of Fig. 1 for detail. The wings 30 and 31 are pressed inwardly and wing 30 is joined to wing 32 of the adjacent slot 33 by means of adhesive 34. Formation of the slots by the above method is completed wherever complementary wings may be fastened together without interference with a portion of the frame 19, thereafter to be mounted. The outside wings of slots 35, 36 and 22, as for example wing 30, have no complementary wings to which they may be joined.

When all of the slots that can be formed without interference with the mounting of the frame have been formed, the blank 10 is laid on the frame 19 in registry. Frame 19 comprises uprights 37 and 38, top 39, bottom 40 and cross supports 41 and 42. The face 20 is tacked in registry to the frame 19. The free wings of slots 35, 36 and 22 are fastened, as by tacking or gluing, to upright 37, as indicated in Fig. 3 where wing 30 is fastened to upright 37 by brad 43. The free wings of slots 44, 45 and 46 are similarly fastened to upright 38.

When all work on the forming of the slots has been completed, the blank is then folded around the frame on the scorings and fastened thereto by means of glue, brads, etc., thereby forming a firm game board capable of long use.

The kit which accompanies the board contains major heading stickers as 47, minor heading stickers as 48 and tokens as 49. The major heading stickers are Food, Shelter, Clothing, Operating expenses, Savings, and Advancement. Six blank major heading stickers are included in the kit for use where particular family problems warrant an unusual heading. The minor heading stickers included in the kit are Groceries, Dairy, Meals out, Fuel, Insurance, Interest payments, Repairs, Mother, Dad, Child, Electricity, Supplies & replacements, Laundry, Lawn & garden, Telephone, Life & accident insurance, Savings acct., Principal payments on home, Education, Health, Personal allowance, Vacation, Investments, Decorating, Rent, Taxes and assessments, Income tax, Cleaning & pressing, Servants, Automobile upkeep, and Clubs and organizations. Fifty blank minor heading stickers are included in the kit.

Tokens in the number of 470 and totalling $8,379.00 are placed in the kit. These tokens have a diameter slightly exceeding the depth of the board so that when lying in the slots, the edges of the tokens project in front of the face of the board. The tokens are of different colors and the selection of colors is based on the thought that the players by quick inspection of a slot can estimate approximately how much is left in the account. All tokens representing silver are green, the one-dollar token is red, the five-dollar token blue, the ten-dollar token yellow, the twenty-dollar token black, and the high value tokens are white. A player can glance at a slot, forget the green tokens and make a quick tabulation of the higher value tokens to determine the balance.

The tokens are very thin, being about the thickness of a dime and when stacked, running about thirty to the inch. The compartments under the heading Exchange in Fig. 1 will not accommodate all of the tokens, but in practise will meet needs. The number of tokens of each denomination with the total value and color of each are as follows:

| Number of tokens | Denomination | Color | Total value |
|---|---|---|---|
| 100 | $0.01 | Green | $1.00 |
| 30 | .05 | ...do | 1.50 |
| 40 | .10 | ...do | 4.00 |
| 30 | .25 | ...do | 7.50 |
| 30 | .50 | ...do | 15.00 |
| 100 | 1.00 | Red | 100.00 |
| 30 | 5.00 | Blue | 150.00 |
| 30 | 10.00 | Yellow | 300.00 |
| 40 | 20.00 | Black | 800.00 |
| 20 | 50.00 | White | 1,000.00 |
| 10 | 100.00 | ...do | 1,000.00 |
| 10 | 500.00 | ...do | 5,000.00 |
| 470 | | | $8,379.00 |

It is to be understood that the number of tokens to be furnished with any commercial adaptation of this invention will be varied to meet the particular need.

Using the board for a straight budget system, the family, at the beginning of an income period, will select such of the major heading stickers as the Budgeteers deem pertinent to their family needs and desires, and then, under these major heading stickers, they will group those minor heading stickers falling within the class of the major heading sticker and pertinent to their family budget problem. For example, under the major heading Savings the family finds only two pertinent minor heading stickers, Life & accident Insurance and Principal payments on home, but the family is making an unusual type of saving in that its members are supporting one party's mother for life in consideration of receiving certain property on her death. A blank minor heading sticker is then filled out To mother and placed under Savings. This family then requires three slots to take care of the item Savings. The major heading sticker Savings is long and will extend over many more than three slots. This family should cut down the Savings sticker from each side until it will extend over three slots only. The Savings sticker is then applied to the face of the board over any three slots in one bank, and the three minor stickers are then applied under Savings, each over one slot. In a similar fashion the selection and grouping of other items of the budget is handled.

When the board has been made up, the problem of allocating a fixed income to the various items arises. The allocation of funds to the items is all important and it is instantly apparent that the only measure for determining the amount for each item is past experience in expenditures. Inasmuch as past experience is usually very vague, the making of a good budget during the first few months will be a bit haphazard. Perhaps the easiest way of making the first budget is as follows: Take tokens from the exchange column in the amount of the monthly income. Assuming a monthly income of $200 paid monthly and assuming that the board is made up in the fashion shown in Fig. 1, drop forty dollars in tokens under Groceries, six under Milk and cream, ten under Meals out, ten under Fuel, ten under Insurance and taxes, five under Repairs, ten under Mother's clothing, eight under Electricity & gas, eight under Laundry, three under Telephone, fifteen under Life & accident insurance, forty-five under Principal payments on home, ten under Automobile upkeep, and five under Charity— church. The $200 income has now been appropriated to these funds, yet some funds have not been touched. For example, each Budgeteer should be given a personal allowance and the slots marked Mother, Father, etc., should be provided for. The Budgeteers must re-examine the proposed budget, particularly those items that are not fixed. Such items as Insurance, Principal payments on home, Telephone, etc., are usually fixed in amount,—they cannot be altered. But other items may vary,—Groceries, Meals out, Clothing, etc., and these items must be reconsidered. Each item is pared down until there is sufficient funds in all other slots pertinent to this family's needs and desires.

When the $200 has been distributed as wisely as possible, the board is mounted at a convenient height, preferably in the kitchen. The Budgeteers keep their money in their purses, bank account and the like, as usual, but as each expenditure is made, each Budgeteer at his earliest convenience withdraws from the pertinent account the amount of tokens spent on any item and returns the tokens to the Exchange account. As the month advances, the Groceries, Dairy, etc., accounts become empty; the Principal payments on home remains full until time to make the payment. If the payment on the home is made monthly, the check is sent when due and the tokens withdrawn from the Principal payments on the home account. Assuming that this is the month of June, the Fuel account will continue full throughout the month and in the following month, a like amount of tokens will be added. Ordinarily, there are no expenditures for coal or oil from April 1 to about October 1, but each month this fuel account is being built up, which means that the money is being built up in the bank, so that by October 1, the savings of April through September amounting to $60 will be at hand and five tons of coal may be bought. In short, the budget is made not only in view of expenditures foreseen in a particular month but in view of expenditures during the year. As the Budgeteers acquire skill, they will be able to make provision for painting the house every other year, etc.

During the first few months, the board cannot give a very complete picture of the family's financial position, but as the months pass, the balance in the bank account and the amounts in the pockets of the various Budgeteers will tend to equal in amount the sum total of the tokens in all of the accounts. This result necessarily follows from careful operation of this budget system, but only experienced Budgeteers will be able to comprehend this system so broadly.

The board itself and use of the board for a budget system have now been presented. The most important use of the board will now be described: to assist in playing the game of Budgeteer. The players in this game are the various members of the family group who are of sufficient age to spend money by themselves. The rules of the game will not be given here, as not being pertinent, but the game will be considered insofar as the physical embodiment in this board, the tokens and the stickers make the game possible. Every one in the family should be encouraged to play the game. The qualities of thrift and foresight can be developed in a child by giving him money to spend and by imposing penalties where he misspends money or by giving him bonuses where he makes wise expenditures.

The first step in the game is to make up the board as described above for a straight budget system but with this addition: sticker marked Score is applied to the board as shown in Figure 1. We will assume that three parties are playing the game,—father, mother and son. The indefinite budget accounts are now assigned to the various players. The controlling principle in making assignments is that the account should go to that party who most likely will spend the money in the account. Under this principal, normally most of the accounts would be assigned to the mother, which would not make the game very even or interesting to the husband. In order to equalize interest, accounts should be assigned to the husband over which he has absolute control even though the wife actually spends the money. As for the son, a slot headed Son's allowance should be assigned to him and it might be wise, from a purely educational standpoint, to assign some fixed budget account, such as Telephone, to him for the purpose of seeing that it is paid.

To stimulate and maintain interest, a system of penalties and bonuses is instituted. This is effected through the Score slot. This slot exists not for the purpose of indicating the comparative records of the players, but to indicate to the parties how well they, as a whole, are keeping the budget. At the beginning of each month, this particular family will place five dollars in tokens in the Score slot. For failure to keep the budget for any day, or for exceeding a budget account, or for making poor budget estimates, a Budgeteer will pay into the Score slot a stipulated penalty to be obtained from the Budgeteer's personal allowance. On the other hand, for keeping the budget estimates, and for making good estimates, bonuses will be paid of a size in accordance with the income of this family from the Score slot. A monetary adjustment must be made, either from time to time, or at the end of the income period. I am confident that this system of bonuses and penalties will provide that stimulus to my budget game which will keep the parties loyal to the game during the early critical months.

Attention is called to the fact that in making the budget, the Budgeteers when playing the game have adverse interests. It is to the mother's interests to get the Groceries account as large as possible and to the father's interests to get his weekly allowance as large as possible. These differences can only be settled by intelligent fair play coupled with a realization that the net effect of the Budgeteer is to benefit the family as a whole.

It is apparent that the game of Budgeteer can only be played on a board having certain features and these features are incorporated into my board. The combination of a group of slots for visual presentation of account balances, of a slot or group of slots for scoring good and poor play, and of tokens, permits rapid adjustment of accounts. The use of tokens as a means of accounting for expenditures and for scoring points as a substitute for money can be effected through my board.

Lastly, my board may be adapted to other purposes without alteration of its physical structure other than the use of different heading stickers. The most conspicuous of these which I particularly wish to cover is in the selling field. Salesmanagers go to great lengths to provide themselves with visual indicators of selling conditions within their territory. Maps with different colored pins to indicate volume are widely used. Wall charts of all sorts serve similar purposes. These latter are used for selling campaigns and changed from day to day. For selling campaigns, the minor heading stickers will indicate salesmen; the major heading stickers will indicate sales territories. The tokens, all of one color, will indicate a certain number of sales. Each salesman will be given a quota and as sales come in, a token will be placed in the proper salesman's slot to indicate the sale. The salesmanager will have on his wall an indicator of percentage attainment which is accurate and which can be used over and over again.

I claim:

1. In a token receptacle, walls spaced by a distance greater than the radius and less than the diameter of a token, apertures in one wall, and a portion of each aperture having a horizontal width of less than the diameter of a token.

2. In a token receptacle, walls spaced by a distance greater than the radius and less than the diameter of a token, T-shaped openings in one wall, the cross bar of each T-shaped opening having a breadth sufficient to pass a token.

3. In a token receptacle, walls spaced by a distance greater than the radius and less than the diameter of a token, T-shaped openings in one wall, the cross bar of each T-shaped opening having a breadth sufficient to pass a token and the vertical bar of each T-shaped opening having a breadth of less than the diameter of a token.

4. In a token receptacle, front and back walls spaced by a distance greater than the radius and less than the diameter of a token, windows in said front wall having a portion of less width than the diameter of a token and formed from wings folded inwardly and held in complementary relation to wings of adjacent slots.

5. In a token receptacle, front and back walls spaced by a distance greater than the radius and less than the diameter of a token, and slots, each formed by the back wall and by two complementary wings pressed inwardly from the front wall, each wing being fastened to the adjacent wing of the adjacent slot.

6. In a token receptacle comprising a frame having cross supports of a depth exceeding the radius but less than the diameter of a token, and a face and back covering, windows cut into the face and having their lower edges adjacent to an upper surface of a cross support of said frame, whereby tokens resting on said cross support may be visible through said window.

7. In a token receptacle, a frame having cross supports of a depth exceeding the radius but less than the diameter of a token, a back, and a face, said face being apertured by T-shaped openings, the cross bar of the T being wholly cut out, and the vertical bar resulting from a slit and oppositely disposed parallel grooves, forming two wings, bent inwardly to form with the back wall three guide points for a slot.

8. In a token receptacle, a frame having cross supports of a depth exceeding the radius but less than the diameter of a token, a back, and a face, said face being apertured by T-shaped openings, the cross bar of the T being wholly cut out, and the vertical bar resulting from a slit and oppositely disposed parallel grooves, forming two wings, bent inward to form with the back wall three guide points for a slot, the wing of each slot being fastened to the adjacent wing of the adjacent slot by suitable means, and where there is no adjacent slot, being fastened to the wall of the frame.

9. A game board comprising a frame for receiving a plurality of tokens of like size and shape, a plurality of horizontal banks of token stacking receptacles disposed in said frame for stacking tokens in orderly arrangement, each bank being positioned at a level different from that of any other bank, each token stacking receptacle being vertically disposed and having a vertical wide opening in the forward wall of same permitting stacked tokens to project beyond the edge thereof while retaining same therein, and permitting visual inspection of the number of tokens stacked in the receptacle, and an indicia bearing panel adjacent to each bank of token stacking receptacles.

WILLIAM L. SCHULZE.